United States Patent [19]
Wawrzyniak et al.

[11] Patent Number: 5,167,589
[45] Date of Patent: Dec. 1, 1992

[54] TRANSFER BAR ACTUATING MECHANISM

[75] Inventors: Walter W. Wawrzyniak, Mt. Clemens; Richard Habarth, Allen Park; Giovanni Pieri, Troy, all of Mich.

[73] Assignee: Practical Engineering, Inc., Roseville, Mich.

[21] Appl. No.: 803,715

[22] Filed: Dec. 4, 1991

Related U.S. Application Data

[63] Continuation of Ser. No. 445,961, Dec. 4, 1989, abandoned.

[51] Int. Cl.[5] .......................... F16H 1/28; F16H 37/12
[52] U.S. Cl. .......................... 475/169; 74/52; 475/14; 475/207; 475/162
[58] Field of Search ............... 74/52; 475/207, 5, 159, 475/176, 177, 169, 170, 14, 162

[56] References Cited

U.S. PATENT DOCUMENTS

| | | | |
|---|---|---|---|
| 2,506,110 | 5/1950 | Rzepela | 74/52 X |
| 3,380,311 | 4/1968 | Muskulus | 74/52 |
| 3,857,292 | 12/1974 | Brems | 74/52 |
| 3,886,805 | 6/1975 | Koderman | 74/52 |
| 3,913,409 | 10/1975 | Opderbeck | 74/52 X |

Primary Examiner—Leslie A. Braun
Assistant Examiner—Benjamin Levi
Attorney, Agent, or Firm—Harness, Dickey & Pierce

[57] ABSTRACT

A mechanism for providing a cycloidal output motion for an output member in a linear direction using a constant velocity rotary input motion driving an off-center input shaft and drive gear and utilizing a secondary motion to influence the position of the drive gear in relation to the output member and the acceleration and deceleration of the output member. A compact embodiment utilizes a ring gear and planetary and a reaction motion to provide the secondary input.

19 Claims, 5 Drawing Sheets

TRANSFER BAR ACTUATING MECHANISM

This is a continuation of U.S. patent application Ser. No. 445,961, filed Dec. 4, 1989, now abandoned.

SUMMARY BACKGROUND OF THE INVENTION

The present invention relates to a transfer bar actuating mechanism for providing a generally cycloidal output motion of an output member in a prescribed linear path and an improved support structure for such a mechanism.

The present invention generally relates to and is an improvement upon the mechanism shown in U.S. Pat. No. 3,857,292 issued on Dec. 31, 1974 to J. H. Brems for Linear Indexing Mechanism.

The Brems mechanism provides a cycloidal action through a combination of gears including an output drive gear which is mounted on an offset crank arm of a crankshaft. The crankshaft arm is also connected to a planetary gear which is in engagement with internal teeth on a fixed ring gear. The planetary gear in turn is connected to the output drive gear. Thus, as the crankshaft is rotated about a drive axis, the planetary gear will rotate about the eccentric axis of the crank arm. At the same time the planetary gear also orbits about the drive axis of the crankshaft. The result is that the drive gear while being rotated and gear driven by the planetary gear will also be moved in a reciprocating translational motion. Thus the drive gear will rotate about an axis which moves linearly in translation from positions in line with the crankshaft drive axis to extended positions on opposite sides of that axis. An elongated drive member having a gear rack engages the drive gear in a rack and pinion type connection and is driven linearly in translation by the drive gear with the desired reciprocating cycloidal motion. The elongated drive member can be used in a manufacturing environment as a transfer bar for moving a pallet holding a workpiece into and out of different work stations.

With the Brems construction the drive gear is substantially supported only by the crank arm and the connection with the planetary gear; thus in its extended positions in translation the drive gear will encounter bearing loads which are offset from the crankshaft drive axis and from the crank arm and support connection with the planetary gear. Such bearing loads can result in wear of the engaged teeth and could also result in limitations in the load capability of the unit and/or the requirement of a larger sturdier structure for a given load requirement.

In the present invention a support structure is provided which moves in translation with the drive gear to provide additional support to the drive gear over the full range of its linear travel. This support structure also assists in maintaining good, uniform engagement between the teeth of the drive gear and the teeth of the gear rack on the drive member or transfer bar. In one form of the invention the support is provided at the axis of the drive gear such that bearing loads from the transfer bar can be resisted. In addition with the present invention the gear mechanism is located in an enclosed housing whereby a pool of lubricant can be maintained to continuously lubricate the engaged components.

It is believed that the above results in a structure which is less susceptible to wear and, because of the continuous support and uniform engagement, can be used in high load applications without the need to enlarge the load carrying members.

In addition the present invention utilizes a gear reduction assembly at the input of the mechanism configured to provide a compact structure.

Therefore it is an object of the present invention to provide an improved transfer bar actuating mechanism of the above described type in which a support structure is provided for linear translational movement with the drive gear to provide support to the drive gear throughout its range of linear travel in translation.

It is another object of the present invention to provide an improved transfer bar actuating mechanism of the above described type in which the support structure provides support to the drive gear at its axis whereby bearing loads from the transfer bar can be resisted.

It is still another object of the present invention to provide a transfer bar actuating mechanism of the above described type in which the gear mechanism is located in an enclosed housing with constant lubrication being applied.

It is another object of the present invention to provide a transfer bar actuating mechanism of the above described type utilizing a gear reduction assembly at the input while providing an overall compact structure.

It is a general object of the present invention to provide a compact drive mechanism for a transfer bar with a simple constant velocity input to provide the transfer bar with a cycloidal linear output with a desirable acceleration and deceleration and a desirable increase in velocity to a rapid intermediate movement and a final decrease to zero velocity and a unique support for the drive mechanism.

Other objects, features, and advantages of the present invention will become apparent from the subsequent description and the appended claims, taken in conjunction with the accompanying drawings.

DESCRIPTION OF THE DRAWINGS

The drawings which accompany the disclosure and the various views thereof be briefly described as.

DESCRIPTION OF THE PREFERRED EMBODIMENTS

Figure 1:
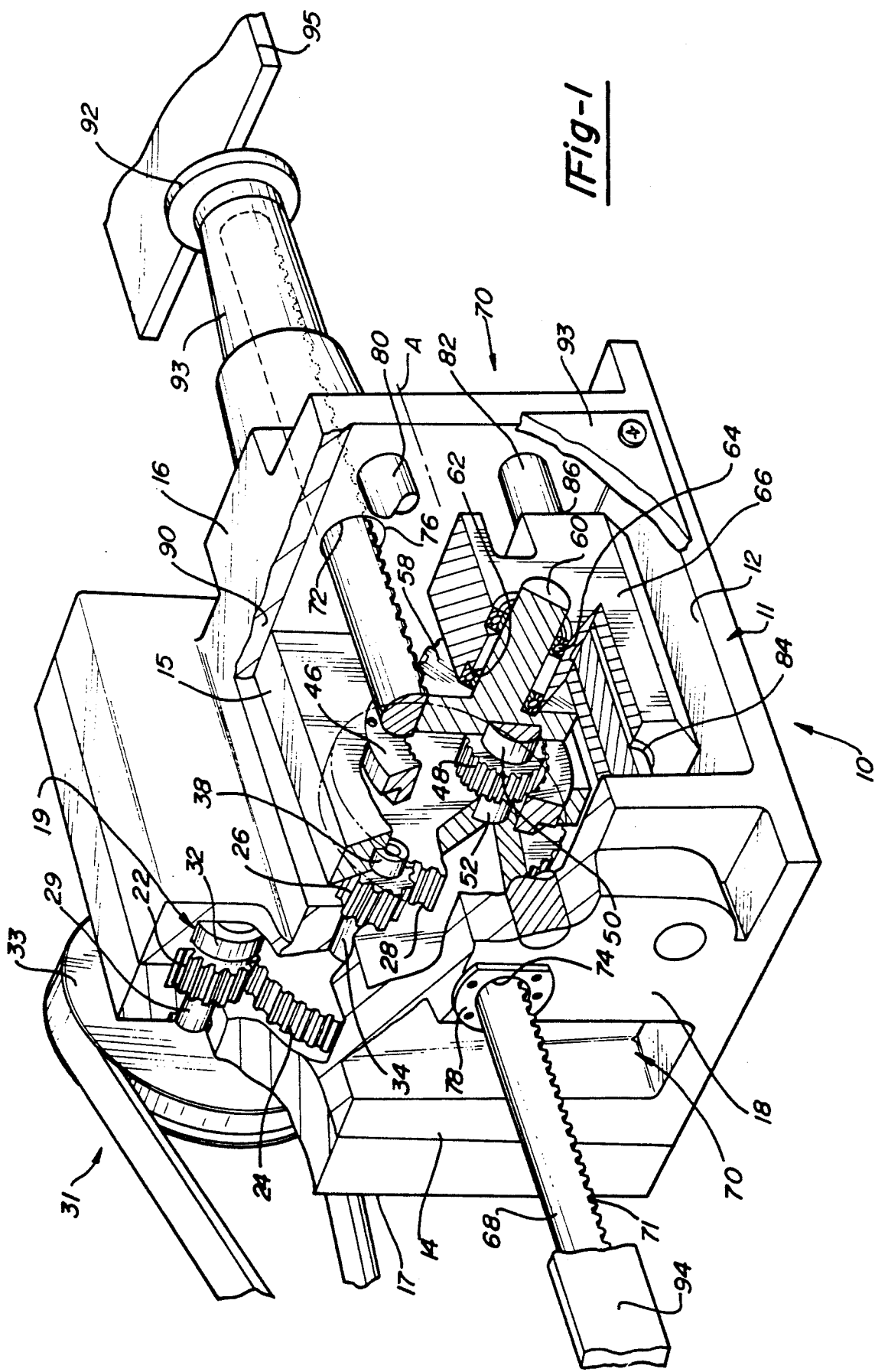
FIG. 1 is a perspective view with some parts shown broken away and others in section of a transfer bar actuating mechanism embodying features of the present invention.
Figure 2:
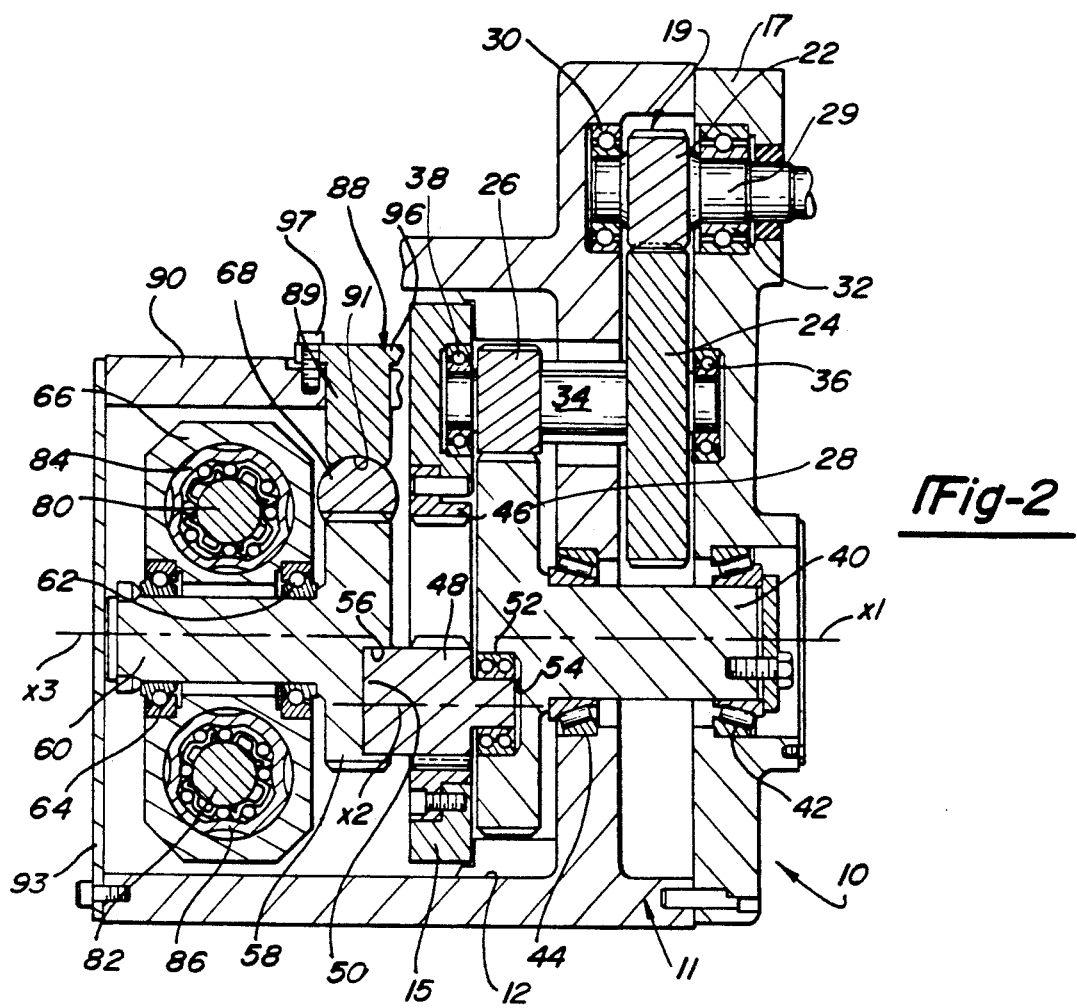
FIG. 2 is a sectional view of the mechanism of FIG. 1 taken generally along the lines 2—2 in FIG. 8.
Figure 11:
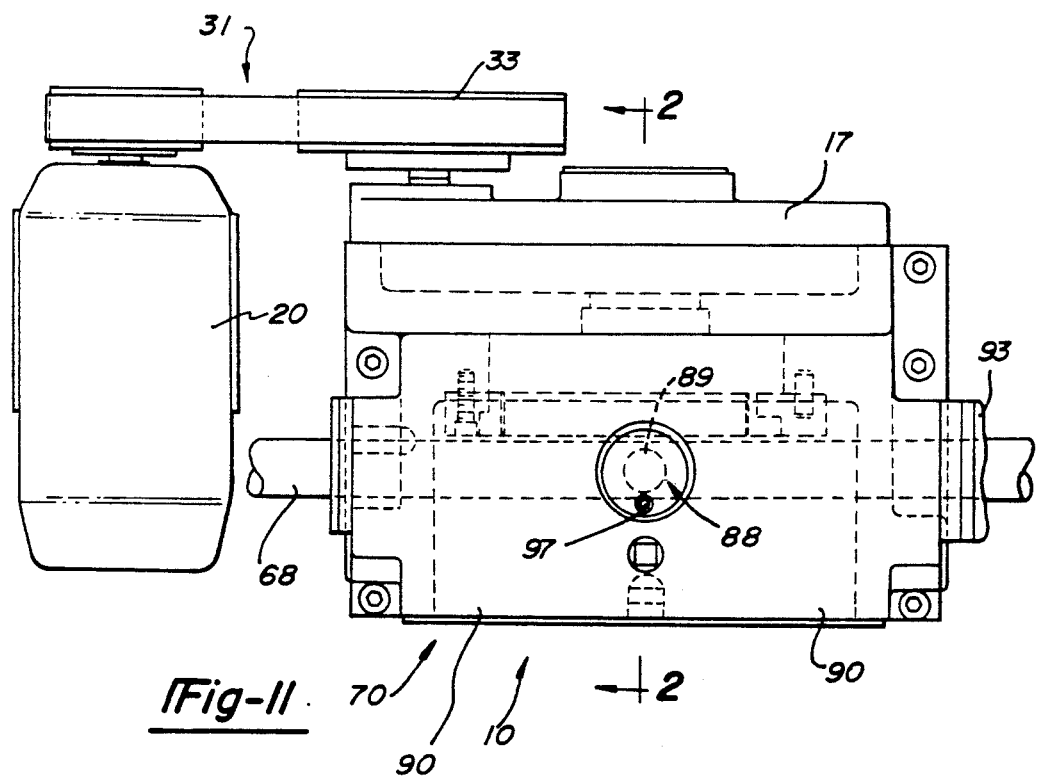
FIG. 11 is a top elevational view of the mechanism of FIG. 1.

Referring to FIGS. 1, 2 and 11 a transfer bar actuating mechanism 10 is shown and includes a frame structure 11 having a base 12, an upright back wall 14, an intermediate plate 15 and a pair of opposite end walls 16 and 18. A drive train 19 is secured to back wall 14 and a back cover plate 17. The drive train 19 is driven by a suitable reversible, constant speed motor 20 in a manner to be described. The drive train 19 includes a gear reduction assembly including a first gear set having a first input gear 22 and first output gear 24 and a second gear set having a second input gear 26 and a second output gear 28. First input gear 22 is secured to a shaft 29 which is journaled in bearings 30, 32 and is driven by motor 20 via a belt drive assembly 31 including a pulley 33 connected to the outer end of shaft 29. First output gear 24 and second input gear 26 are secured in laterally spaced positions upon another shaft 34 which is journaled at its opposite ends in bearings 36, 38. The second output gear 28 is provided with a shaft 40 which is journaled in bearings 42, 44 for rotation about a drive axis X1.

A stationary internal or ring gear 46 is supported in intermediate plate 15 with its axis being in coincidence with axis X1.

A planetary gear 48 is secured to a shaft 50 having one end journaled in bearing 52 for rotation about an axis X2. The bearing 52 is supported in an enlarged, recessed bore 54 located in the second output gear 28 such that axis X2 is radially offset from axis X1. Note that by nesting the bearing 52 and associated end of shaft 50 in the recessed bore 54 a compact structure can be provided. The planetary gear 48 is thus secured for geared engagement with the internal teeth of the ring gear 46. The planetary gear 48 is connected to a drive gear 58 via the opposite end of shaft 50 which is located and fixed in a bore 56 recessed in the drive gear 58. The drive gear 58 in turn is secured to a shaft 60 journaled in bearings 62, 64 supported in a support member 66. Shaft 60 supports drive gear 58 for rotation about its axis X3. With this connection, as the planetary gear 48 rotates about its axis X2, it also orbits around the axis X1. As this occurs the planetary gear 48 will move drive gear 58 and its axis X3 linearly in translation relative to the axis X1. As will be seen, the support member 66 is adapted to move linearly in translation to support the drive gear 58 in its corresponding linear movement.

The axis X1 of ring gear 46 and of shaft 40 of second output gear 28 is parallel to the axis X2 of the planetary gear 48 and of its support shaft 50, and the distance from axis X1 to axis X2 is one-half of the pitch radius of the internal or ring gear 46. At the same time the planetary gear 48 has a pitch diameter which is one-half the pitch diameter of the ring gear 46. Thus the planetary gear 48 will make two complete revolutions about its axis X2 while it orbits once about the axis X1.

An elongated transfer bar 68 is supported for linear movement on frame structure 11 and is of a generally circular cross section having a flat surface on its lower side formed with rack gear teeth 71 adapted to mesh with the gear teeth of drive gear 58 and thereby generally operate therewith as a rack and pinion arrangement. While a generally circular cross section for the transfer bar 68 is shown other suitable cross sections could be employed. With this construction the transfer bar 68 and drive gear 58 will move linearly with the support member 66 as the drive gear 58 is rotated about axis X3 via its connection with the support shaft 50 of planetary gear 48.

From FIGS. 1, 2 and 11 it can be seen that the frame structure 11 is part of a generally enclosed housing 70. The housing 70 is provided with in line openings 72, 74 at opposite end walls 16 and 18 in which support bushings 76, 78 are located and receive opposite ends of the transfer bar 68 to support it for reciprocal linear motion. Support bushings 76, 78 are of a standard construction and hence the details thereof have been omitted for purposes of simplicity. Note that the circular section portion of the transfer bar 68 extends for around 270° so that ample support is provided by the bushings 76, 78 while still permitting clearance for the rack gear teeth 71. The support member 66 is located within the housing 70 and is in turn supported upon a pair of vertically spaced stationary support and guide rods 80 and 82 which are fixed in end walls 16 and 18 at opposite ends of the housing 70. The support member 66 is slidably mounted upon the support and guide rods 80, 82 via ball bushings 84, 86, which are utilized to provide a substantially frictionless support. In this regard the ball bushings 84, 86 can be a type well known in the art, such as the series XA bushings manufactured and sold by Thomson Industries of Port Washington, N.Y., and as shown in Thomson catalog No. 99080686-50 dated 1986, and hence the details thereof have been omitted for purposes of simplicity.

The length of the rods 80, 82 is sufficient to accommodate the full linear travel of the drive gear 58 whereby the support member 66 will support the drive gear 58 over the full extent of its linear travel. Thus as the drive gear 58 moves in linear, translational motion the support member 66 moves with it to support it on the rods 80, 82. At the same time the rods 80, 82 act as guides to assist in accurately maintaining the desired line of travel of the transfer bar 68. In this regard, it should be noted that the support member 66 provides support to drive gear 58 through its associated shaft 60 and thus support is provided to resist loads on drive gear 58 from its engagement with transfer bar 68 which are directed transversely or have a component directed transversely to its axis X3 and/or directed along a line Y from the point of geared engagement to the axis X3. Thus the above structure provides generally direct support and hence resistance to loads on drive gear 58 regardless of its linearly translated position.

Note that the input drive to the drive gear 58 is from the side with the planetary gear 48; thus the opposite side of the drive gear 58 with shaft 60 is accessible for easy connection to the support member.

A center support member 88 is of a T-shaped construction and has a bar portion 89 which extends from a circular attachment base portion 96 which in turn is secured to the upper plate 90 of the housing 70 via a fastener 97. The bar portion 89 is generally circular in cross section and engages the upper surface of the transfer bar 68 to support it from bending and/or deflection and hence further assists in maintaining good, uniform engagement between the rack teeth of the transfer bar 68 and the gear teeth of the drive gear 58. The bar portion 89 is positioned to engage the upper surface of the transfer bar 68 at a location in line with the axis X3 when the drive gear 58 is in its linearly centered position and will thus provide support at the area of driving engagement between the transfer bar 68 and drive gear 58. (See FIGS. 3-10). In this regard the engaging surface 91 of the support portion 89 is provided with an arcuate contour generally matching the contour of the upper surface of the transfer bar 68 with which it is in engagement.

In addition to the upper plate 90 which is secured to frame structure 11 to close the top of the housing 70, a front plate 93 is secured and sealed to the front of frame structure 11. Thus the housing 70 is substantially closed and sealed and hence can be filled with oil or a suitable lubricant up to a desired level such as level A in FIG. 1. In this way the engaged and moving parts will continuously be lubricated whereby wear will be inhibited. In this regard, the forward or working end of the transfer bar 68 has secured to it a flexible, collapsible cone 93 of a known spiralled, telescoping construction such that as the forward, working end of the transfer bar 68 moves towards and away from the housing 70 the cone 93 can expand or contract in length to catch the lubricant dripping from the transfer bar 68 and to return the lubricant back to the pool in the interior of the housing 70. An attachment plate 92 or other suitable structure is provided at the forward, working end of the transfer bar 68 to engage an associated pallet such as pallet 95 to move it into and out of a desired work station. The opposite, nonworking end of the transfer bar 68 is located within a closed casing 94 secured to housing 70; the casing 94 is fixed in length and protects the associated end portion of the transfer bar 68 as it moves into and out of the housing 70.

Figure 3:
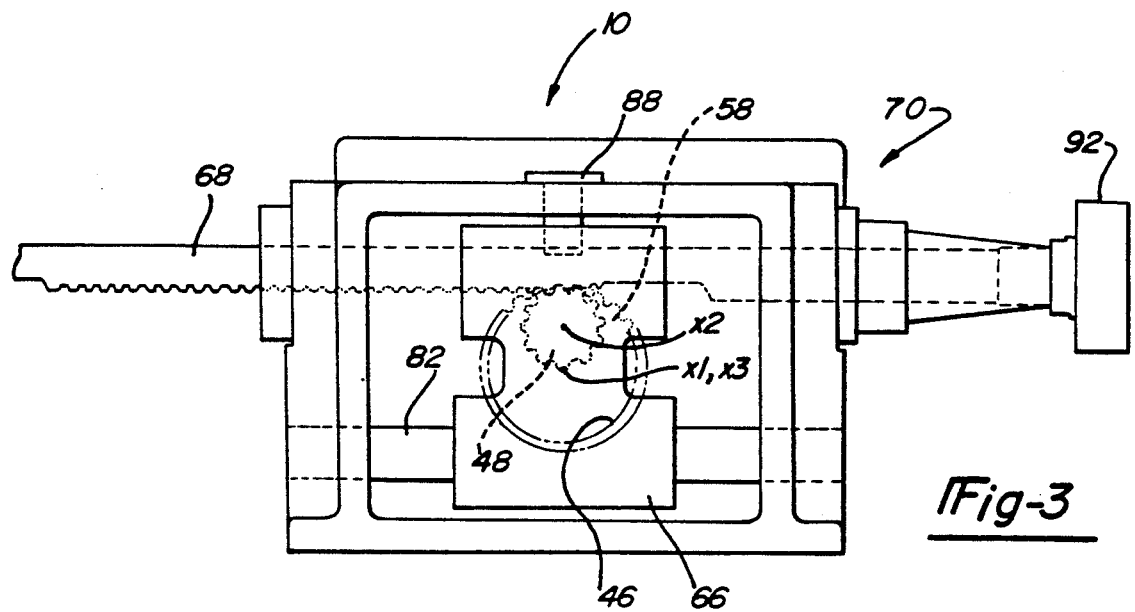
FIGS. 3–10 are side elevational views of the mechanism of FIG. 1 depicting the mechanism at various sequential stages of operation.

The total output stroke of the transfer bar 68 in one direction is equal to the pitch circumference of the drive gear 58. At each end of the stroke the axes X1 and X3 are coincident as shown in FIGS. 3 and 10. The output stroke requires one revolution of both the second output gear 28 and drive gear 58 with one complete orbit of the planetary gear 48 about axis X1; at the same time planetary gear 48 will make two revolutions about its axis X2. This can best be described by reference to FIGS. 3 to 10, which are a set of sequential generally schematic drawings showing some of the principal components during a typical index motion.

In FIG. 3, all components are shown in their start positions when the transfer bar 68 is in dwell at the retracted end of its stroke. Axes X1 and X3 are substantially in coincidence, and axis X2 lies in its upper, vertically displaced position relative to axis X1 and generally in the same vertical plane as axes X1 and X3. At this point actuation of motor 20 in a forward direction will provide a substantial angular movement of the second output gear 28 but will initially cause only a very slight relative linear movement of the transfer bar 68.

Figure 4:
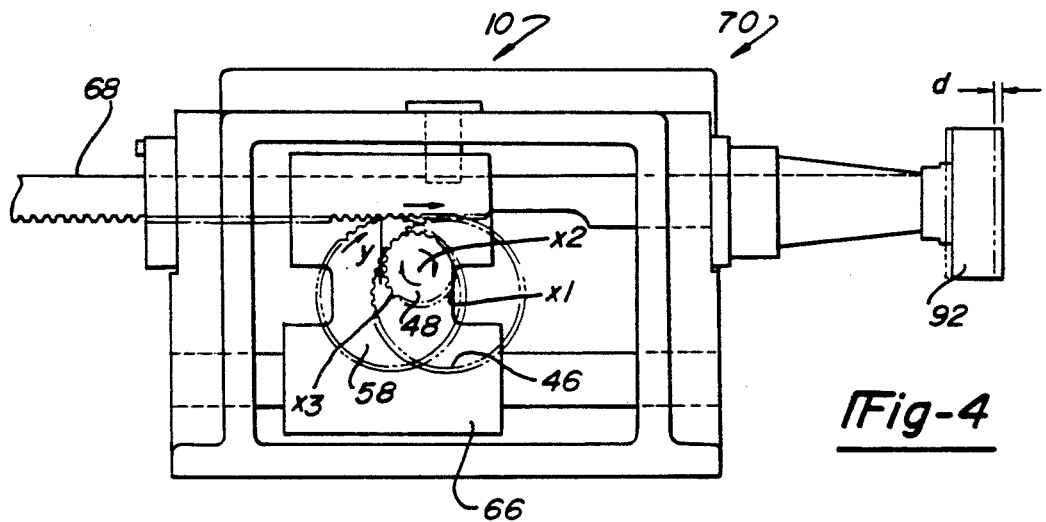

FIG. 4 depicts the mechanism 10 after the planetary gear 48 has orbited 45° in the counterclockwise direction about axis X1 resulting in movement of the transfer bar 68 a distance d.

Figure 5:
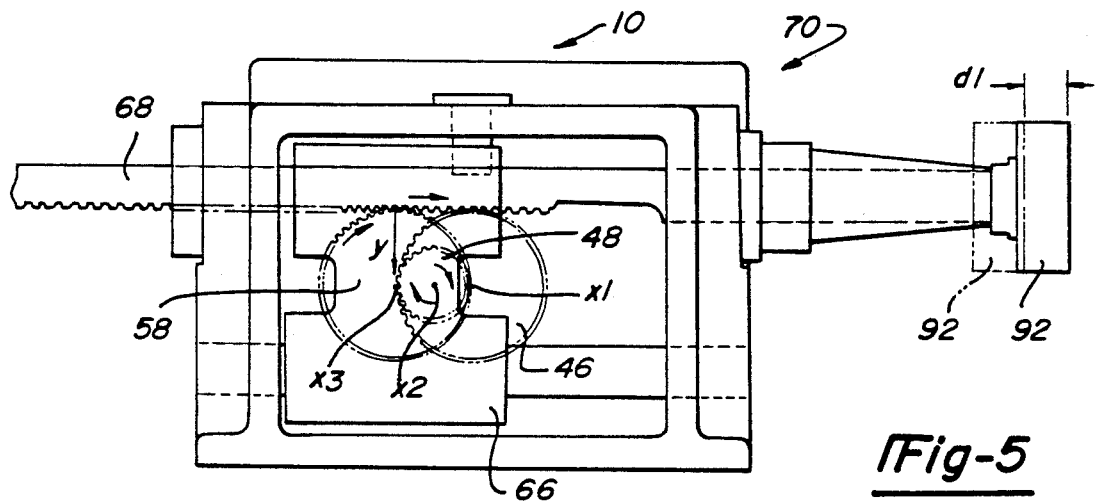

After the planetary gear 48 has orbited 90° in the counterclockwise direction about axis X1, the condition shown in FIG. 5 is reached. At the same time, the planetary gear 48 has rotated 180° clockwise about its axis X2; the drive gear 58 has rotated 90° clockwise with respect to its axis X3, while the axis X3 has moved linearly, rearwardly in translation a distance equal to the pitch radius of the drive gear 48. During this interval, the transfer bar 68 has advanced slightly outwardly, forwardly from housing 70 while smoothly accelerating in that direction.

Figure 6:
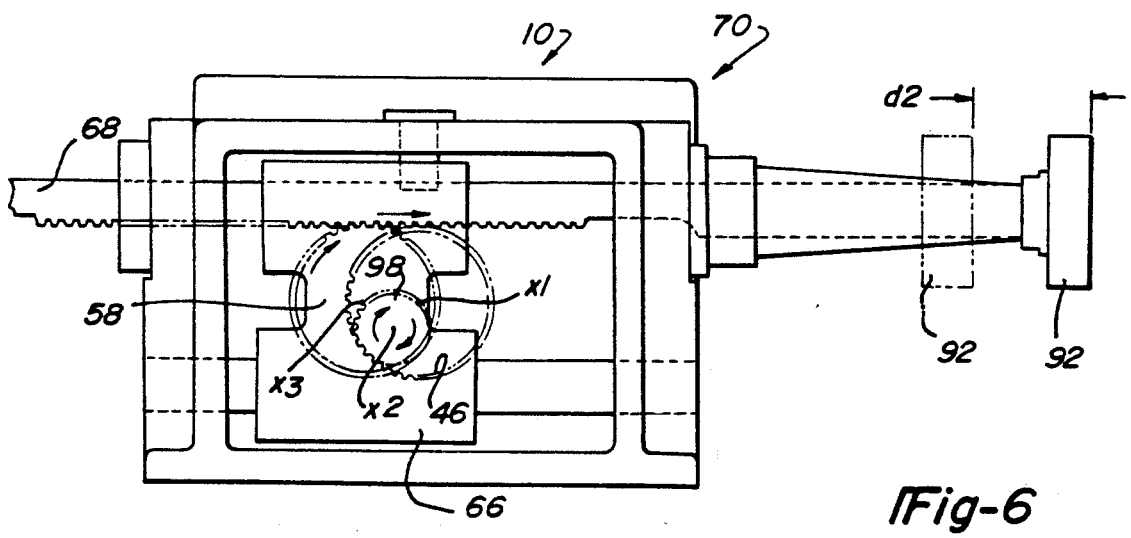

FIG. 6 depicts the mechanism 10 after the planetary gear 48 has orbited 135° in the counterclockwise direction about axis X1 resulting in movement of the transfer bar 68 a distance d2.

Figure 7:
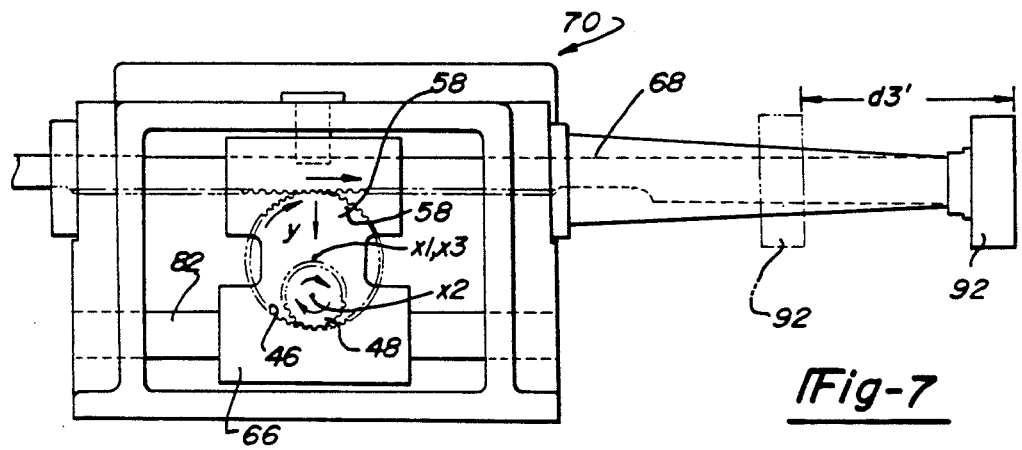

After the planetary gear 48 has orbited an additional 45° (180° total) in the counterclockwise direction about axis X1, the condition shown in FIG. 7 is reached. The planetary gear 48 has now rotated a total of 360° clockwise about its axis X2. The drive gear 58 has rotated 180° clockwise with respect to its axis X3, while the axis X3 has returned to a position substantially in coincidence with the fixed axis X1. At this time the transfer bar 68 has moved forwardly a total distance d3 equal to the pitch circumference of planetary gear 48 or through one-half of its total stroke. It is at this point that the transfer bar 68 has reached its maximum velocity.

Figure 8:
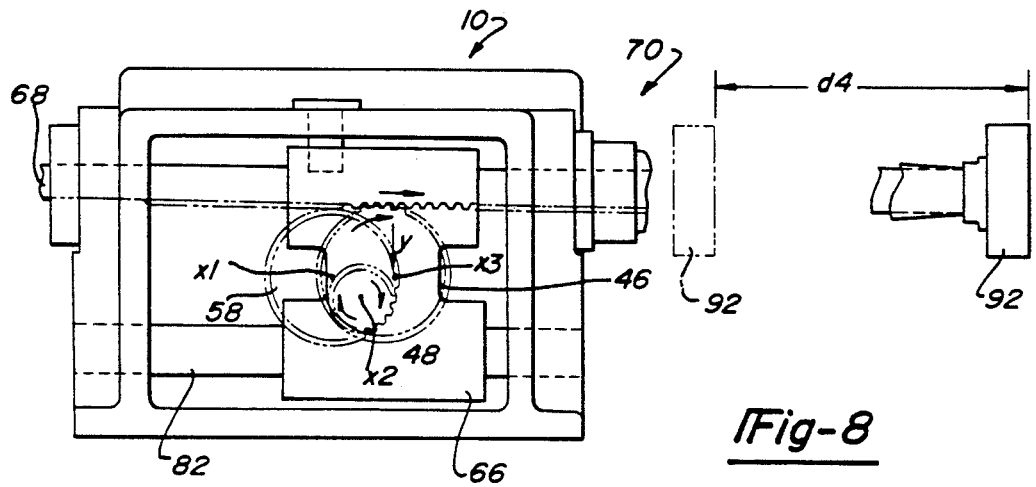

FIG. 8 depicts the mechanism 10 after the planetary gear 48 has orbited 225° in the counterclockwise direction about axis X1 resulting in movement of the transfer bar 68 a distance d4.

Figure 9:
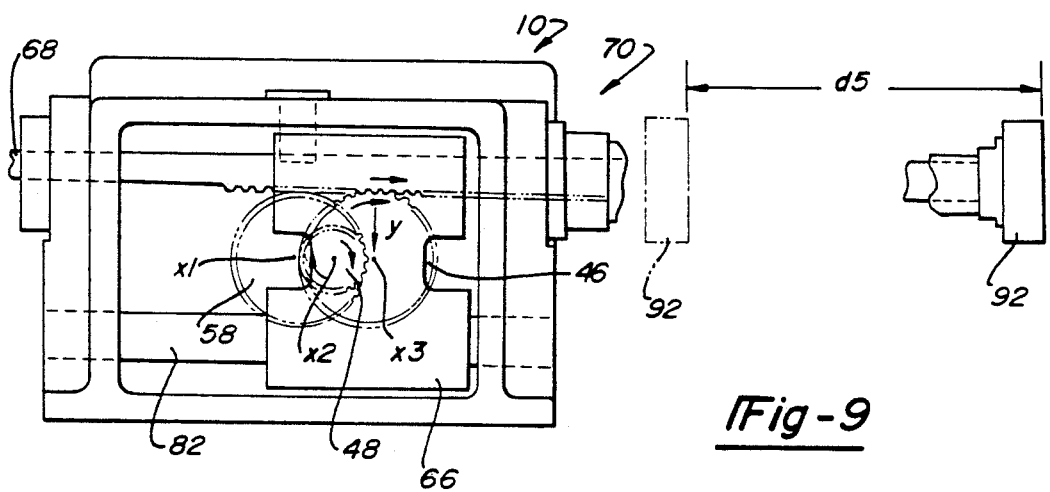
Figure 10:
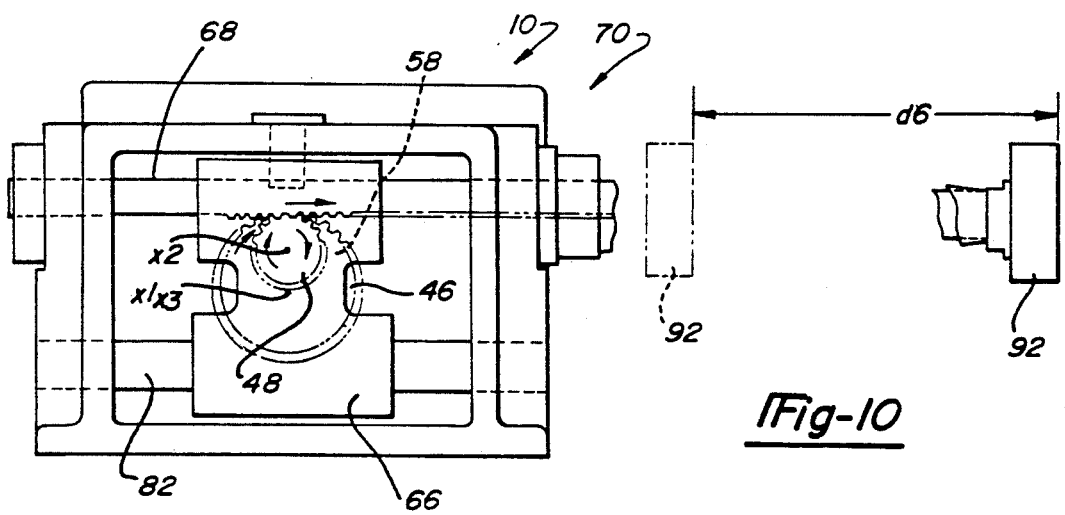

After the planetary gear 48 has orbited an additional 45°, or 270° total, in the counterclockwise direction about axis X1, the condition shown in FIG. 9 is reached. The planetary gear 48 has now also rotated a total of 540° clockwise relative to its axis X2. The drive gear 58 has rotated 270° clockwise with respect to its axis X3, while its axis X3 has moved forwardly linearly in translation to the opposite side of the axis X1 a distance equal to the pitch radius of the drive gear 58. The transfer bar 68 has advanced forwardly, outwardly from housing 70 a total distance of d5 or through an increment from the position of FIG. 7 to that of FIG. 9 equal to its movement between FIGS. 5 and 7 and therefore has almost reached the end of its stroke.

After the planetary gear 48 has orbited still another 90°, or a total of 360°, in the counterclockwise direction about axis X1, the condition shown in FIG. 10 is reached. The planetary gear 48 has now rotated a total of 720° clockwise relative to its axis X2. The drive gear 58 has rotated 360° clockwise with respect to its axis X3. The axis X3 is again coincident with axis X1 and all components, except the transfer bar 68, are back in the same position as shown in FIG. 3. The transfer bar 68 is again in dwell but has indexed forwardly a distance d6 equal to the pitch circumference of the drive gear 58.

During the index sequence described above, the transfer bar 68 accelerates smoothly from zero in FIG. 3, reaches a maximum velocity at the point shown in FIG. 7, and then decelerates smoothly during the las half of its movement until a dwell is again reached in FIG. 10. This can be seen by reference to FIGS. 3–10. This motion is accomplished, as noted utilizing a motor 20 running at a constant speed and hence rotating second driven gear 28 at a constant speed.

While the mechanism shown and the description thereof concerns itself with a stroke having a total length equal to the pitch circumference of the drive gear 58, it will be understood that, if the transfer bar 68 is made of the appropriate length, an output stroke of any number of steps or cycles may be generated; in the latter case each such step consists of one full rotation of drive gear 58 and the associated acceleration-deceleration cycle.

The mechanism is reversible, i.e., by reversing the direction of the rotary input from motor 20, the direction of linear motion of the transfer bar 68 is reversed. Thus the transfer bar 68 can be returned to its original position as shown in FIG. 3 by simply reversing the direction of rotation of the motor 20. Starting, stopping and reversing the motor 20 can be accomplished by appropriate sensing and circuit means known to those skilled in the art and since such does not form a part of the present invention they have been omitted for simplicity.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is;

1. A mechanism for generating a substantially cycloidal output movement comprising:
    a fixed ring gear having a circular internally toothed structure with a first axis, a planetary gear secured for engagement with said fixed ring gear and being rotatable about a second axis eccentric from said first axis, drive means secured to said planetary gear for driving said planetary gear for rotation about said second axis and for rotating said planetary gear and said second axis in an orbit around said first axis, a drive gear member, an elongated output bar member mounted for rack and pinion type geared engagement with said drive gear member, mounting means mounting said drive gear member for rotation about a third axis, connecting means connecting said planetary gear to said drive gear member with said second axis being eccentric to said third axis whereby rotation of said planetary gear about said second axis and orbiting of said planetary gear about said first axis drives said drive gear member in rotation about said third axis, said drive gear member and said third axis moving linearly in translational movement as said drive gear member is rotated about said third axis whereby the motion of said output bar member varies in a cycloidal manner, support means connected to said drive gear member and adapted to move linearly in translation with said drive gear member and to provide support to said drive gear member for said geared engagement with said output bar member generally transverse to said third axis substantially throughout said translational movement of said drive gear member.

2. The mechanism of claim 1 further comprising input means connected to said drive means for rotating said planetary gear in said orbit at a constant rotational velocity.

3. The mechanism of claim 1 further comprising motor means providing an output at a preselected rotational velocity, speed reducer means for connecting the output of said motor means to said drive means for driving said planetary gear at a speed reduced from said preselected rotational velocity.

4. The mechanism of claim 1 further comprising input means connected to said drive means rotating said planetary gear in said orbit at a constant rotational velocity, said input means comprising motor means for providing an output at a preselected rotational velocity and speed reducer means for connecting the output of said motor means to said drive means for driving said planetary gear at a speed reduced from said preselected rotational velocity.

5. The mechanism of claim 1 with said drive gear member having a support shaft, said support means being operatively connected with said support shaft for moving linearly in translation with said support shaft to provide support for said drive gear member.

6. The mechanism of claim 1 with said drive gear member having a support shaft, said support means being operatively connected with said support shaft for moving linearly in translation with said support shaft to provide support for said drive gear member, said support means comprising a body member and slide means for supporting said body member for linear translational motion, said support shaft being operatively connected with said body member.

7. The mechanism of claim 1 with said drive gear member having a support shaft, said support means being operatively connected with said support shaft for moving linearly in translation with said support shaft to provide support for said drive gear member, said support means comprising a body member and slide means for supporting said body member for linear translational motion, said support shaft being operatively connected with said body member, said slide means comprising at least one elongated stationary bar with said body member slidably supported upon said stationary bar.

8. The mechanism of claim 1 including a substantially enclosed housing, said mechanism located within said housing with said housing having a pool of lubricant for lubricating said mechanism.

9. The mechanism of claim 1 with said drive means being located on a first side of said planetary gear, said drive gear member located on the opposite side of said planetary gear, said support means being connected to said drive gear member on a side of said drive gear member opposite from said planetary gear.

10. The mechanism of claim 1 with said support means moving linearly in translation in response to movement of said drive gear member linearly in translation.

11. The mechanism of claim 1 including a support member adapted to engage said output bar member generally in the area of engagement of said output bar member with said drive gear member.

12. A mechanism for generating a substantially cycloidal output movement comprising:

a first drive member, mounting means mounting said first drive member for rotation about a first axis, an output member in operative engagement with said first drive member for being driven in response to rotation of said first drive member about said first axis, drive means connected to said first drive member and including a second drive member mounted for rotation about a second axis and operatively connected to said first drive member for rotating said first drive member about said first axis, said drive means connected to said first drive member at a location radially offset from said first and second axes, said first drive member and said first axis moving linearly in translational movement as said first drive member is rotated about said first axis whereby the motion of said output member varies in a cycloidal manner, support means connected to said first drive member and adapted to move linearly in translation with said first drive member and to provide support to said first drive member for said operative engagement with said output member generally transversely to said first axis substantially throughout said translational movement of said drive gear member, said drive means comprising a ring gear having a third axis extending generally co-axially with said second axis and a planetary gear operatively connected with said ring gear and adapted to orbit about said third axis, and further comprising means connecting said planetary gear and said first drive member at said radially offset location whereby said first drive member is rotated about said first axis by said planetary gear as said planetary gear orbits around said third axis.

13. The mechanism of claim 12 further comprising motor means providing an output at a preselected rotational velocity,
   speed reducer means for connecting the output of said motor means to said drive means for driving said planetary gear at a speed reduced from said preselected rotational velocity.

14. The mechanism of claim 12 further comprising input means connected to said drive means for rotating said planetary gear in said orbit at a constant rotational velocity, said input means comprising motor means providing an output at a preselected rotational velocity and speed reducer means for connecting the output of said motor means to said drive means for driving said planetary gear at a speed reduced from said preselected rotational velocity.

15. The mechanism of claim 12 with said drive means being located on a first side of said planetary gear, said first drive member located on the opposite side of said planetary gear, said support means being connected to said drive member on a side of said first drive member opposite from said planetary gear.

16. A mechanism for generating a substantially cycloidal output movement comprising:
   a first drive member,
   mounting means mounting said first drive member for rotation about a first axis,
   an output member in operative engagement with said first drive member for being driven in response to rotation of said first drive member about said first axis,
   drive means connected to said first drive member and including a second drive member mounted for rotation about a second axis and operatively connected to said first drive member for rotating said first drive member about said first axis,
   said drive means connected to said first drive member at a location radially offset from said first and second axes,
   said first drive member and said first axis moving linearly in translational movement as said first drive member is rotated about said first axis whereby the motion of said output member varies in a cycloidal manner,
   support means connected to said first drive member and adapted to move linearly in translation with said first drive member and to provide support to said first drive member for said operative engagement with said output member generally transversely to said first axis substantially throughout said translational movement of said drive gear member, said drive means comprising a ring gear having a third axis extending generally co-axially with said second axis and a planetary gear operatively connected with said ring gear and adapted to orbit about said third axis, and further comprising connecting means connecting said planetary gear and said first drive member at said radially offset location whereby said first drive member is rotated about said first axis by said planetary gear as said planetary gear orbits around said third axis, input means connected to said drive means for rotating said planetary gear in said orbit at a constant rotational velocity.

17. A mechanism for generating a substantially cycloidal output movement comprising:
   a first drive member,
   mounting means mounting said first drive member for rotation about a first axis,
   an output member in operative engagement with said first drive member for being driven in response to rotation of said first drive member about said first axis,
   drive means connected to said first drive member and including a second drive member mounted for rotation about a second axis and operatively connected to said first drive member for rotating said first drive member about said first axis,
   said drive means connected to said first drive member at a location radially offset from said first and second axes,
   said first drive member and said first axis moving linearly in translational movement as said first drive member is rotated about said first axis whereby the motion of said output member varies in a cycloidal manner,
   support means connected to said first drive member and adapted to move linearly in translation with said first drive member and to provide support to said first drive member for said operative engagement with said output member generally transversely to said first axis substantially throughout said translational movement of said drive gear member, said first drive member having a support shaft, said support means being operatively connected with said support shaft for moving linearly in translation with said support shaft to provide support for said first drive member.

18. A mechanism for generating a substantially cycloidal movement comprising:
   a first drive member,
   mounting means mounting said first drive member for rotation about a first axis,
   an output member in operative engagement with said first drive member for being driven in response to rotation of said first drive member about said first axis,
   drive means connected to said first drive member and including a second drive member mounted for rotation about a second axis and operatively connected to said first drive member for rotating said first drive member about said first axis,
   said drive means connected to said first drive member at a location radially offset from said first and second axes,
   said first drive member and said first axis moving linearly in translational movement as said first drive member is rotated about said first axis whereby the motion of said output member varies in a cycloidal manner,
   support means connected to said first drive member and adapted to move linearly in translation with said first drive member and to provide support to said first drive member for said operative engagement with said output member generally transversely to said first axis substantially throughout said translational movement of said drive gear member, said first drive member having a support shaft, said support means being operatively connected with said support shaft for moving linearly in translation with said support shaft to provide support for said first drive member,
   said support means comprising a body member and slide means for supporting said body member for linear translational motion, said support shaft being operatively connected with said body member.

19. A mechanism for generating a substantially cycloidal output movement comprising:

a first drive member, mounting means mounting said first drive member for rotation about a first axis, an output member in operative engagement with said first drive member for being driven in response to rotation of said first drive member about said first axis, drive means connected to said first drive member and including a second drive member mounted for rotation about a second axis and operatively connected to said first drive member for rotating said first drive member about said first axis, said drive means connected to said first drive member at a location radially offset from said first and second axes, said first drive member and said first axis moving linearly in translational movement as said first drive member is rotated about said first axis whereby the motion of said output member varies in a cycloidal manner, support means connected to said first drive member and adapted to move linearly in translation with said first drive member and to provide support to said first drive member for said operative engagement with said output member generally transversely to said first axis substantially throughout said translational movement of said drive gear member, said first drive member having a support shaft, said support means being operatively connected with said support shaft for moving linearly in translation with said support shaft to provide support for said first drive member, said support means comprising a body member and slide means for supporting said body member for linear translational motion, said support shaft being operatively connected with said body member, said slide means comprising at least one elongated stationary bar with said body member slidably supported upon said bar.

* * * * *

UNITED STATES PATENT AND TRADEMARK OFFICE
CERTIFICATE OF CORRECTION

PATENT NO. : 5,167,589

DATED : December 1, 1992

INVENTOR(S) : Walter W. Wawrzyniak et al

It is certified that error appears in the above-identified patent and that said Letters Patent is hereby corrected as shown below:

Col. 2, line 41, after "thereof" insert --may--.

Col. 6, line 32, delete "las" and substitute --last--.

Col. 9, line 21, Claim 15, after "said" first occurrence, insert --first--.

Signed and Sealed this

Fourteenth Day of December, 1993

*Attest:*

BRUCE LEHMAN

*Attesting Officer*　　　*Commissioner of Patents and Trademarks*